April 25, 1967  E. KONIG ETAL  3,315,517
THERMAL CONDUCTIVITY DETECTOR CELL
Filed March 19, 1964
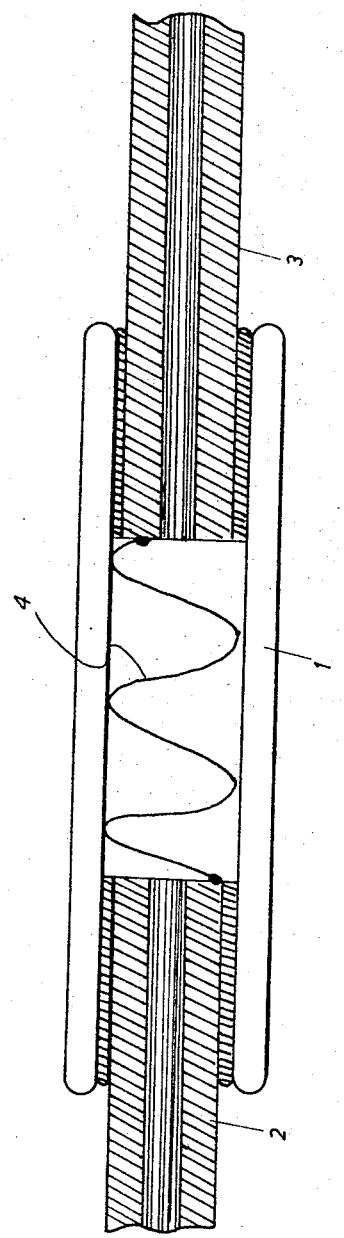
EBERHARD KONIG
HANS EGON RODEL
*INVENTORS.*

United States Patent Office 3,315,517
Patented Apr. 25, 1967

3,315,517
THERMAL CONDUCTIVITY DETECTOR CELL
Eberhard König, Uberlingen (Bodensee), and Hans Egon Rödel, Sipplingen (Bodensee), Germany, assignors to Bodenseewerk Perkin-Elmer & Co. G.m.b.H., Uberlingen (Bodensee), Germany
Filed Mar. 19, 1964, Ser. No. 353,098
Claims priority, application Germany, Apr. 10, 1963, B 71,471
8 Claims. (Cl. 73—27)

This invention relates to an improved thermal conductivity detector for use in gas analysis instruments. In particular, the invention concerns such a detector for use in gas chromatographic instruments, especially those in which small capillary (Golay) separating columns are used.

In United States patent application Ser. No. 255,879, filed Feb. 4, 1963, now U.S. Patent No. 3,243,991 (corresponding to German patent application B 65,919), applicants have disclosed one type of thermal conductivity detector especially suitable for use with the small volumes and volumetric flow rates of a Golay column gas chromatograph. In particular, this prior application (which is hereby incorporated by reference) discloses a thermal conductivity detector composed of a small, sleeve-like glass body or casing connected between the exit end of an inlet capillary tube (preferably a Golay separating column) and the adjacent entrance end of the discharge or venting tube for the gas sample. By sealing or cementing the glass body directly between the confronting faces of the column and the venting tube, an extremely small volume, thermal conductivity detector cell is obtained. The heating element (which is a thermistor) is inside this small glass body in the direct stream of the gas flow, thereby achieving a rapid response because of the elimination of any appreciable dead volume.

According to a preferred embodiment in this prior patent application, the capillary tubes are metallic and simultaneously serve as current leads for the heating element. The present invention is an improvement of such an arrangement.

In the detector cells according to the above prior patent application, a thermistor bead, serving as the heating element, is centrally suspended in the detector cell by the connecting wires. Although such an arrangement is mechanically stable, it is dependent on the temperature. It is desirable in many cases to replace the thermistor bead by a simple filament, composed, for example, of platinum or tungsten. However, difficulty is encountered in that only a limited length of wire can be placed in the customary manner in the necessarily small volume inside the detector cells constructed according to this earlier patent application. For achieving high sensitivity, it is desirable for the wire to have a relatively great resistance, which may be achieved by a small wire cross-section or great length (or both).

It is the object of the present invention to improve the arrangement according to the prior patent application in this respect. According to the invention this object is attained by forming the heating element as a coiled wire of great pitch, abutting the walls of the detector cell body.

It has been determined that in such an arrangement of the coil, there is heat transfer from the heating element to the colder cell walls, and therefore the cooling of the heating element is substantially affected by changes in the thermal conductivity of the gas passing therethrough. In particular, the thermal conductivity of the gas, and therefore its composition, essentially determines the heat transfer from the heating element to the opposite wall, and therefore the temperature of the heating element. The heat transfer from the heating element to the immediately adjacent wall is not influenced by the gas composition, if the wire is in contact with the surface of the wall.

In an arrangement employing a helix having wide-spaced loops or coils (that is, a helix of great pitch) the cooling of the heating element is dependent on the thermal conductivity of the gas since there is a heat transfer from the coil through the gas to the neighboring wall portions. If, in contrast thereto, the coils of the helix are close together or tightly wound (that is, a helix having small pitch), then there would be practically no heat transfer through the gas to the walls since the coil would act like a continuous heat source. Then, the conduction of the heat from the heating element only takes place, on the one hand, by direct contact with the walls and, on the other hand, by heat absorption of the gas stream travelling axially through the coil. Then, it would not be the thermal conductivity of the analyzed gas that would be the decisive factor in the cooling, but rather the thermal capacity thereof.

The arrangement according to the invention is advantageous since the coil may abut the cell walls, and thus good mechanical stability is ensured. It is preferable to have the coil attached or cemented to the cell wall. The arrangement of the invention makes it possible to place a sufficient length of platinum or other type wire as the heating element in a desirably small volume so that high sensitivity is obtained.

Other objects and advantages of the invention will be obvious to one skilled in the art from the preceding general description and the succeeding specific description of a specific embodiment, in conjunction with the accompanying drawing, in which:

The sole figure is a longitudinal cross-sectional view of a preferred embodiment of the invention.

Glass or similar non-conducting sleeve or casing 1 is sealed or cemented at its ends to the adjacent ends of metallic capillary tubes 2 and 3, respectively. A stream of gas is normally fed through capillary column or inlet tube 2, through sleeve 1, and capillary venting tube 3. Platinum (or other suitable metallic) wire 4 in the form of a helical coil of great pitch is connected to each of the confronting ends of tubes 2 and 3, respectively, by spotwelding or the like. The coil 4 rests against the walls of the glass sleeve 1 and may be sealed or cemented thereto. Electric current is caused to flow through one of the metallic tubes (2, 3) through coil 4 and then through the other tube. The coil 4 effects a heat transfer dependent on the thermal conductivity of the gas to the respective opposite wall. For this reason, the temperature and thus the electric resistance or conductivity of wire 4 depends on the thermal conductivity of the gas flowing therethrough and changes with the composition thereof, so as to give an indication of any changes in the composition of the gas flowing through the detector cell formed by glass sleeve 1.

As stated in the inventors' above-mentioned patent application, usually two heat conductivity detectors are utilized, one in the sample stream and the other in pure carrier gas (i.e., without any sample) as a comparison or standard. The difference in the resistance (and therefore of the temperature) of the sample and standard detector elements are obtained by means of an electrical bridge circuit, which allows measurement of any difference in the voltage across the two elements of the two detectors. In such arrangements, the standard detector cell would, of course, be identical to above described device, except that only pure standard gas would be constantly flowing through the two capillary tubes and the glass sleeve forming the detector cell.

In one specific embodiment intended for commercial manufacture, the inner diameter of the glass sleeve or casing is about one millimeter, the outside diameter of coil 4 being the same. The coil is formed from platinum wire having a filament diameter of about 20–25 microns (i.e., about 0.020 to 0.025 millimeter). As previously noted, the helical coil should have relatively great pitch, so that the individual loops in the specific example are spaced apart about two millimeters. The total length of the coil (after being wound) is about 30 millimeters and its D.C. resistance about 20–30 ohms at room temperature.

Since sleeve 1 is preferably made of quite thin glass or other insulating material (thinner than shown in the drawing if it were to scale), an outer spaced sleeve of thicker glass (not shown) may be utilized to improve both the mechanical strength of the assembly and to provide an outer insulating air space around sleeve 1. The ends of such an outer sleeve would be connected to capillary tubes 2 and 3 at points relatively near (but beyond) the ends of the thin glass sleeve 1. The inside diameter of the outer sleeve should be substantially greater than the outside diameter of sleeve 1 so that an insulating air space completely surrounds this inner sleeve. In order to avoid any pressure changes in the air between the two sleeves with change in temperature, at least one venting hole should be supplied through the outer sleeve. The thermal conductivity path through the gas is still from the coil 4 through the gas to the opposite wall of the inner sleeve 1.

Although a single specific embodiment of the invention has been shown and described, it should be understood that this embodiment is intended to be only exemplary of the invention, which is defined solely by the appended claims.

We claim:

1. A heat conductivity detector for gas analysis, for use with a small diameter inlet tube and a small diameter venting tube, the exit end of said inlet tube and the entrance end of said venting tube being in closely spaced confronting relationship, comprising:
   a small diameter, small volume, sleeve-shaped detector casing, having its opposite ends adapted to be sealed to the exit end of said inlet tube and the entrance end of said venting tube, respectively;
   a heating element, a physical characteristic of which varies with temperature, in the form of a helical coil of wires arranged coaxially inside said sleeve-shaped casing;
   the diameter of said coil being substantially as large as the internal diameter of said casing so that said coil is at least in close proximity to the inner surface of said casing;
   said helical coil having a pitch of more than five times the diameter of said wire, so that the individual loops are widely spaced from each other as compared to said wire diameter;
   the thermal conductivity of the gas inside said casing thereby affecting the heat transfer from said helical heating element to the exposed parts of the casing wall;
   whereby the temperature and therefore said physical characteristics of said heating element varies according to the presence and concentration of certain components in said gas stream.

2. A detector according to claim 1, in which:
said wire of said heating element is electrically conducting and said physical characteristic is electrical resistance.

3. A detector according to claim 1, in which:
said helical coil of wire abuts said inner surface of said casing.

4. A detector according to claim 3, in which:
said helical coil is physically attached to said inner surface.

5. A heat conductivity detector for gas analysis comprising:
   a small diameter inlet tube having an exit end at which a gas stream evolves;
   a small diameter, small volume, sleeve-shaped detector casing having one end sealingly attached to said exit end of said inlet tube;
   a small diameter venting tube having its entrance end sealingly attached to the other end of said detector casing;
   and a heating element, a physical characteristic of which changes with temperature, in the form of a helical coil of wire arranged coaxially inside said sleeve-shaped detector casing;
   the diameter of said coil being substantially as large as the internal diameter of said casing so that said coil is at least in close approximity to the inner surface of said casing, substantially all of the gas stream therefore passing through the helix formed by said coil;
   said helical coil having a pitch of more than five times the diameter of said wire, so that the individual loops are widely spaced from each other as compared to said wire diameter;
   the thermal conductivity of the gas therefrom affecting the heat transfer from said helical heating element to the exposed parts of the casing wall;
   whereby the temperature and therefore said physical characteristic of said heating element varies according to the presence and concentration of sample components in said gas.

6. A detector according to claim 5, in which:
said wire of said heating element is electrically conducting and said physical characteristic is electrical resistance.

7. A detector according to claim 6, in which:
at least one of said inlet and venting tube is metallic and therefore electrically conducting;
and the end of said helical coil heating element adjacent said metallic tube is physically connected thereto so as to make an electrical connection therewith, so that said metallic tube and said heating element form together an electrical current path.

8. A detector according to claim 6, in which:
both of said inlet and venting tubes are metallic and therefore electrically conducting;
and the ends of said helical coil heating element are physically and electrically connected to said inlet tube and said venting tube respectively;
said inlet and venting tubes and said heating element thereby forming together a continuous electrical current path.

References Cited by the Examiner

UNITED STATES PATENTS

| | | | |
|---|---|---|---|
| 2,786,350 | 3/1957 | Johnson | 73—27 |
| 2,805,134 | 9/1957 | Strange | 73—27 |
| 3,075,379 | 1/1963 | Schmauch | 73—27 |
| 3,243,991 | 4/1966 | Koing et al. | 73—27 |

FOREIGN PATENTS

| | | |
|---|---|---|
| 110,756 | 5/1944 | Sweden. |
| 673,143 | 6/1952 | Great Britain. |
| 1,146,415 | 5/1957 | France. |

RICHARD C. QUEISSER, *Primary Examiner.*

J. C. GOLDSTEIN, *Assistant Examiner.*